Figures 1, 2, 3:
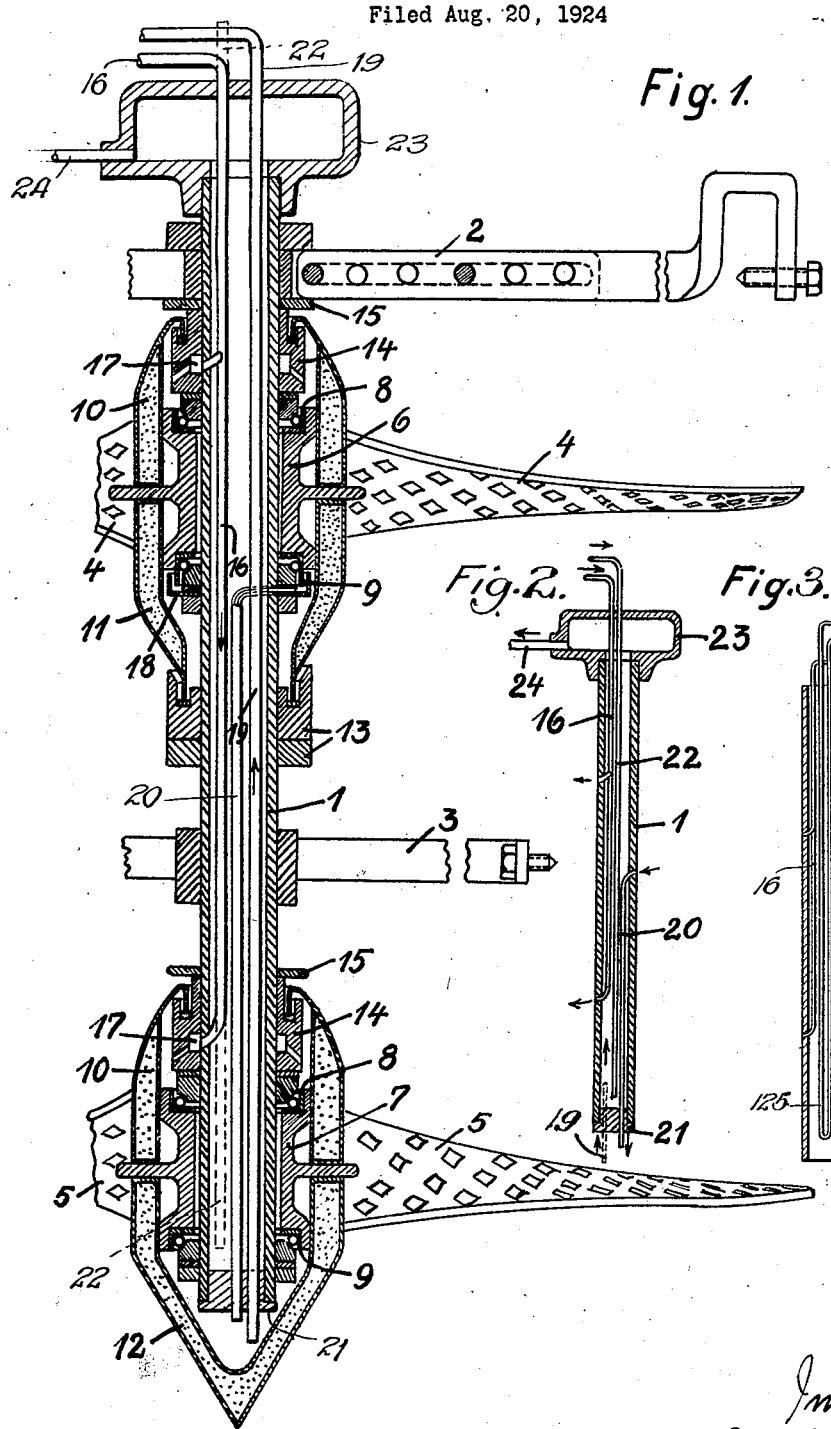

June 4, 1929.  O. KOOK  1,715,458
CURRENT REGULATOR
Filed Aug. 20, 1924

Inventor
Otto Kook
By —O. Singer, Atty.

Patented June 4, 1929.

1,715,458

UNITED STATES PATENT OFFICE.

OTTO KOOK, OF MAGDEBURG, GERMANY.

CURRENT REGULATOR.

Application filed August 20, 1924, Serial No. 733,239, and in Germany August 31, 1923.

The invention relates to a regulating device which by being inserted into channels, in which currents of air or gas flow, is adapted to making such currents more regular, to shatter solid bodies and especially sparks, which are contained in the current, and to counteract any ignition of explosive gases passing the channel.

In known spark extinguishers two blade wheels, rotating in inverse sense, are used, but thereby much throttling of the current is produced, if the blades cover the channel area sufficiently for ensuring an effective extinguishing action and for being surely rotated by the current. It is also known to provide the blades with perforations for the purpose of distributing the current particles.

The essential feature of the invention consists therein, that the current regulator has two blade wheels, which are inversely rotated by the current, and the blades of which are perforated by a great number of holes with sharp edges, at least one of said blade wheels covering nearly the whole channel diameter. Hereby an extraordinary sure action is reached, as later described.

Further essential parts of the invention consist in durable bearings for the blade wheels, and in combined means for lubricating and cooling said bearings and for protecting them against dust and heat, so that sure action is obtained even under the severe conditions existing in hot gas currents, as for instance in locomotive chimneys.

The invention is illustrated in the drawing by way of example on a spark extinguisher for use on locomotives, Fig. 1 being a section of one form provided with lubrication by a pump, Fig. 2 being a section of a part of another form provided with additional water or air cooling, Fig. 3 is a detail sectional view of the hollow axle provided with a U-shaped cooling pipe according to a modification in the construction of the apparatus.

In the first constructional form a hollow axle 1 is fitted with an upper arm cross 2 and with a lower arm cross 3, adapted to be fastened on different spots, so as to support the apparatus in any channel or chimney; the arms of said arm crosses are for this purpose of adjustable length.

On the axle 1 two blade wheels 4, 5 are mounted, of which the uppermost has blades which nearly completely cover the chimney diameter and have a pitch going from the right to the left, whilst the lower blade wheel is somewhat smaller and its blades have a pitch going from the left to the right. Both blade wheels are therefore rotated by the gas current in inverse directions. The blades of both wheels are perforated on their whole surface by a great number of holes, which are properly cut out from the metal, so as to be confined by sharp edges.

The blade wheels 4, 5 are fastened to two naves 6, 7, which have flanges for supporting the blades by welding, riveting or other adapted means. Each of the said naves contains two ball bearing rings 8, 9, in which balls and cones of the type known in bicycle bearings are inserted. It is also possible to use instead combinations of radial bearings and thrust bearings of other known types. The upper nave 6 is on its outer face enveloped by two covers 10, 11, which have hollow walls, constructed of sheet metal and filled up with asbestos or similar nonconductors of heat. The said covers are screwed onto the nave and fit tightly against its flange. On the lower nave 7 the top cover 10 corresponds to that of the upper nave, but the bottom cover 12 which is also screwed to the nave has a closed bottom of conical shape, so as to form a receiver for the oil coming from the bearings. The bottom cover 11 of the upper nave has an axially projecting edge which engages into an annular tightening groove of a tightening body 13 fastened to the axle 1. The both top covers 10 have their free edges bent downwardly and engaging in similar manner into annular grooves of tightening bodies 14, which simultaneously serve as counter nuts for the upper ball bearing cones. Covering rings 15 protect the last mentioned grooves from foreign bodies entering them.

Inside the hollow axle 1 an oil tube 16 is inserted, which with two branches extends to the spots, where the said tightening bodies 14 are fastened to the axle 1, and the tightening bodies have annular grooves 17 in connection on one hand with said branches and on the other hand by borings with the outer space containing the ball bearings. For collecting the oil coming from the bearings the lower bearing ring 9 is axially extended into a ring 18, from which the oil by borings is led to the interior of the hollow axle 1 so as to join in the bottom cover 12 with the oil coming from the lower nave. An oil suction tube 19 extends from the said lowermost point through the hollow axle upwardly and to the suction side of a pump feeding the oil feed tube 16.

As may be seen, by the described extraordinary good protection from heat and dust and by the cooling lubrication the bearings are adapted to sustain high numbers of revolutions under every circumstance. The oil may be recooled by a cooler, and be filtered every time before entering the apparatus.

In the constructional form, shown in Fig. 2, an oil outlet tube 20, located inside the hollow axle 1, is attached to the oil outlet (18 in Fig. 1) of the upper nave; this outlet tube passes through a bottom screw 21, which closes the hollow axle 1, into the oil receiver. As also the oil feed pipe 16 is completely closed against the interior of the hollow axle 1, this latter is available for an additional cooling by feeding to it a special cooling fluid such as air or water. For feeding a cooling fluid a cooling tube 22 is extended into the hollow axle 1 down to its bottom, and an outlet casing 23 is fastened to the axle; an outlet tube 24 is provided for leading the cooling water or the like. The quantity of oil fed to the bearings may then be reduced and this reduces the friction, with regard to the extraordinary high numbers of revolutions.

In this case, it is usually sufficient to remove the remainders of used oil occasionally by unscrewing and removing the bottom cover 12, but an oil sucking tube 19 may be extended from the oil receiver through the bottom screw 21 and the hollow axle to a sucking device.

Where the outer heat is not very high, it is sufficient to use air cooling by replacing the water in the described circuit by air, which for instance on locomotives may be gained from the brake air containers, from which it is to be expanded, and cooled by this expansion. In this case the apparatus may be simplified by dispensing with the oil outlet tube 20, the bottom screw 21, the water outlet tube 24 and the upper part of the oil feed tube 16, the latter being bent to the side of the casing 23 with an open mouth. The air entering the lower part of the hollow axle is mixed with the oil (for which purpose a mixing nozzle may be provided), and the oil and air mixture goes upward and is cooled at once by the air and then the oil falls again down through the feed pipe 16 to the bearings after being freed from the air, which is exhausted by a top opening of the casing 23.

As a modification of the first form of construction according to Fig. 1 an additional cooling by water or air is also possible by inserting into the hollow axle a U-shaped cooling pipe 25 the bend of which is shown at 125 or any other closed circuit containing pumping and recooling means. Such modified construction is shown in Fig. 3.

The action of the blade wheels is the usual one so far as the sparks are destroyed and the gas current is regulated, but the special features according to the invention cause these effects to be extraordinarily augmented, so that especially on locomotives an essential saving of fuel (up to 15%) is reached, leakage of the boiler tubes is reduced and the necessity of cleaning the tubes is also reduced, owing to the extraordinary softening of the too strong blows of the flames in the moments of steam exhaust and owing to the acceleration exerted in the intermediate moments by the blade wheels on the gas current. The holes in the blades avoid not only undue throttling of the current but they produce a strong rotating moment on the blades, and at once the number of revolutions of the blade wheels is prevented from becoming too great, as owing to the holes the rotating moment essentially decreases with increasing number of revolutions. Hereby not only destruction of the blade wheels by the centrifugal forces is avoided, but also the bearings are enabled to conserve their good action as the reduced velocity of rotation entire with the good cooling and lubrication gives the possibility of surely running the apparatus. Thus the great advantages, which the apparatus is able to produce, may be surely utilized.

I claim:

1. A bearing of the class described, comprising in combination an upright hollow axle, bearings supported on said axle, rotatable hubs enclosing said bearings, heat resisting protecting covers on said rotatable hubs, and a feed pipe in said axle for supplying a lubricating fluid.

2. A bearing of the class described, comprising in combination an upright hollow axle, bearings supported on said axle, rotatable hubs enclosing said bearings, heat resisting protecting covers on said rotatable hubs, and a feed pipe in said axle for supplying a lubricating fluid, and means for leading a cooling fluid, such as water or air, through the said hollow axle.

3. A bearing of the class described, comprising in combination an upright hollow axle, bearings supported on said axle, rotatable hubs enclosing said bearings, heat resisting protecting covers on said rotatable hubs, and a feed pipe in said axle for supplying a lubricating fluid, a tightening nut closing the bottom end of the said hollow axle, an oil outlet tube extending from the lower parts of the said bearings through said hollow axle and tightening nut, a feed pipe for feeding cooling fluid to the bottom of said hollow axle, and a discharge pipe attached to the top end of said hollow axle.

4. A bearing of the class described, comprising in combination an upright hollow axle, bearings supported on said axle, rotatable hubs enclosing said bearings, heat resisting protecting covers on said rotatable hubs, and a feed pipe in said axle for supplying a lubricating fluid, each of said heat protecting covers consisting of an upper and a lower double walled sheet metal casing, the walls of which are filled with heat protecting material.

5. A bearing of the class described, comprising in combination an upright hollow axle, bearings supported on said axle, rotatable hubs enclosing said bearings, heat resisting protecting covers on said rotatable hubs, having peripheral bent edges at their ends, a feed pipe in said axle to supply lubricating fluid tightening bodies fastened to said hollow axle and provided in their upper sides with annular grooves, said covers having downwardly extending annular flanges arranged in said grooves.

6. A bearing of the class described, comprising in combination an upright hollow axle, bearings on said axle, rotatable hubs enclosing said bearings, heat resisting covers on said hubs, a feed pipe in said axle for supplying a lubricating fluid to said bearings, a tightening nut closing the bottom end of the said hollow axle, an oil outlet tube extending from the lower parts of the said bearings through said hollow axle and tightening nut, a feed pipe for feeding cooling fluid to the bottom of said hollow axle, and a discharge pipe attached to the top end of said hollow axle.

7. A bearing as claimed in claim 2 in which said protecting covers on said rotatable hubs are hollow and comprise each an outer wall and inner wall and insulating material between said walls.

8. A bearing as claimed in claim 2 in which said protecting covers on said rotatable hubs are hollow and comprise each an outer wall and inner wall and insulating material between said walls and in which said rotatable hubs are provided with flanges which secure said covers to said hubs.

In witness whereof I affix my signature.

OTTO KOOK.